Patented Mar. 2, 1954

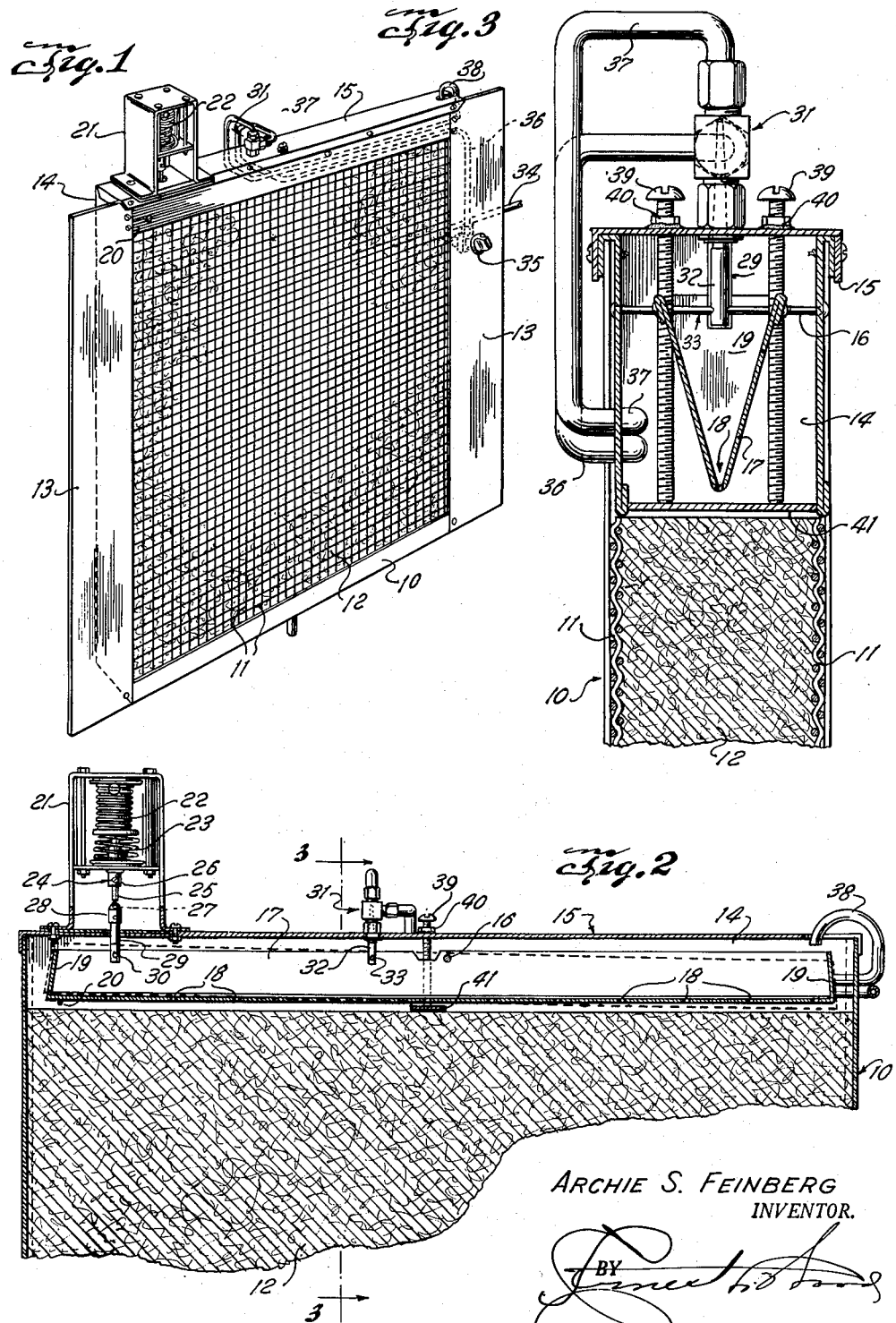

2,670,941

UNITED STATES PATENT OFFICE 2,670,941

THERMOSTATIC WATER CONTROL FOR WINDOW MATS

Archie S. Feinberg, Dallas, Tex.

Application October 30, 1952, Serial No. 317,647

9 Claims. (Cl. 261—39)

This invention relates to evaporative coolers and more particularly to window mats, operative in conjunction with attic fans for reducing the temperature of air influenced through the mats by the attic fan.

Evaporative cooling through the medium of moistened window mats in conjunction with attic fans is not new. It is desirable, however, to provide humidity control for individual window mats which is sensitively responsive to outside temperature fluctuations to insure comfort to the occupants of a room or building throughout a wide range of temperatures with provision for complete automatic operation of the humidity control.

It is, therefore, the principal object of the present invention to provide thermostatic moisture evaporation zone control for individual window mats in which the volume of water supplying moisture to the mat and the wetted area of the mat is varied in direct relation to variations in outside temperature. Thus, during periods of high dry bulb temperatures, the quantity of water deposited into the mat is considerably in excess of that received by the mat during low dry bulb temperatures at which time the relative humidity of the air is higher and moisture carrying capacity is less.

It is another object of the invention to provide mechanism for increasing and decreasing the flow of water into an evaporative cooler mat in direct proportion to the increasing and decreasing of dry bulb temperatures, through the medium of wholly automatic means.

Broadly, the invention provides a filter mat having a pivoted water trough supported in the top of the mat frame having a multiplicity of water outlet orifices from end to end and a thermostat for tilting the water trough so that as temperature increases the orifices in the trough will be covered by water progressively from one end to the opposite end of the trough. In this manner, the moistened area of the mat will be increased as dry bulb temperature increases and conversely, the moistened area will decrease as dry bulb temperature decreases after having its effect upon the thermostat. Moreover, the invention provides for a complete shutting off of water to the trough when the atmospheric temperature has reached a point where further entrainment of moisture in the air drawn through the mat would cause discomfort to the room occupants.

With the foregoing and other objects in view, reference is made to the accompanying drawing wherein:

Figure 1 is a perspective view of a window mat on which is installed the thermostatic moisture zone control of the present invention.

Figure 2 is a fragmentary view in vertical section, and

Figure 3 is a fragmentary transverse section taken on line 3—3 of Figure 2.

Continuing with a more detailed description of the drawing, reference numeral 10 denotes broadly the frame of a window mat having foraminous sides 11 and containing a quantity of wood shaving or other filter material 12. Side panels 13 extend from each side of the mat frame and by which the frame is secured in a window.

Co-extensive with the top of the frame 10 is a housing 14 having a removable cover 15. Mounted longitudinally within the housing 14 and supported on a centrally located transverse shaft 16 is a water trough 17 of substantially V-shape in transverse section. This trough has a multiplicity of water outlet orifices 18 which are arranged in spaced relationship from one end of the trough to the other. The trough has closed ends 19 and under one end of the trough there is provided a transverse pin 20, whose ends are anchored in opposing sides of the housing 14 and serves as a movement limiting means for the trough.

Supported by the cover 15 adjacent one end of the housing, 14 is a frame 21 containing a bellows 22 charged with a gas which is sensitive to the slightest change in surrounding temperature, expanding when the temperature rises and contracting as the temperature recedes. The upper end of the bellows 22 bears against the top of the frame 21 while the lower end is supported on a coil spring 23 which is effective to collapse the bellows as the gas contracts and counters the expansive action of the bellows to serve as a stabilizing medium. Attached to the under side of the bellows 22 is a hollow stem 24 into which extends a pin 25 and held therein by a set screw 26. On the lower end of the pin is a ball 27 which is movably retained in a socket 28 mounted on the upper end of a rod 29, the latter, in turn, being oscillatively joined to a shaft 30 which has its ends secured in opposite sides of the trough 17.

It is evident from the foregoing that as dry bulb temperature recedes or as wet bulb temperature increases, the bellows 22 will contract, thereby raising the trough 17 at one end so that water deposited into the trough in the manner to be presently set forth, will flow to the opposite end of the trough and will flow from the trough only through the orifices 18 adjacent said opposite end of the trough. In this manner, only that portion of the mat 12 directly below the active orifices will be wetted. Conversely, as the dry bulb temperature increases, the gases in the bellows 22 will expand to cause the bellows to exert a downward thrust on the end of the trough 17 to which it is attached in the manner explained, whereupon the water in the trough will flow towards the lower end of the trough and will overflow a greater number of the orifices 18 to correspondingly moisten a more extensive area of the mat 12. At extreme high temperatures, all of the orifices 18 will be covered with water since the trough will have moved to a horizontal position, limited by the stop 20.

Near the mid-section of the housing 14 and supported on the cover 15 is a needle valve housing 31. A needle valve 32 is pivoted at 33 to the trough 17 and extends into the valve housing 31. Water from a municipal source passes through a water inlet tube 34 (Fig. 1). A manually actuated valve 35 controls passage of water through a tube 36 which is connected at one end to the valve 35 and extends upwardly behind panel 13 of the frame 10, thence horizontally in the housing 14 to its approximate mid-section whereupon it extends from the housing upwardly above the latter where it communicates with the needle valve housing 31. Connected also with the needle valve housing 31 is a tube 37 which extends outwardly and downwardly and into the housing 14 where it extends in parallelism with tube 36 out of the end of the housing 14 and has its free end turned upwardly and downwardly as indicated at 38 to discharge into one end of the trough 17.

In operation, the valve 35 is opened to allow water to flow through tubes 34 and 36 into the needle valve housing 31. When dry bulb temperatures are such as to require any portion of the mat 12 to be moistened, the needle valve 32 will be in open position. Under such conditions, the water will flow through the valve housing 31 into tube 37 which will convey the water into the trough 17 in an amount proportionate to the angular position of the trough. Obviously, at high temperatures, when the trough 17 is in a horizontal position the needle valve 32 will be fully opened so that a quantity of water will be supplied sufficient to saturate the mat 12 from side to side. However, when the temperature recedes to a point where it would be uncomfortable to the occupants of a room to entrain any moisture into the air influenced through the mat, the trough 17 will be elevated on its pivot 16 by the bellows 22 to the maximum degree, whereupon the needle valve 32 will move to fully closed position, shutting off all water supply to the trough 17.

It is sometimes required to adjust the needle valve 32 in relation to its seat. This is accomplished through the medium of parallel adjusting screws 39 which are threaded through nuts 40 affixed to the top 15 of housing 14 on opposite sides of its center. The lower ends of these screws bear against a transverse bridge 41 which has its ends affixed to opposite sides of the housing 14. The purpose in providing two adjusting screws is to insure against warping the cover 15 as the screws are rotated to raise and lower the needle valve 32 in relation to its seat.

Manifestly, the construction as shown and described is capable of some modification and such modification as may be construed to fall within the scope and meaning of the appended claims is also considered to be within the spirit and intent of the invention.

What is claimed is:

1. In an evaporative cooling mat for windows, an automatic moisture control comprising a frame for said mat, a housing co-extensive with the top of said frame having a cover, a water trough pivoted at its mid-section within said housing and having water outlet orifices in its bottom, means responsive to variations in dry bulb temperature mounted adjacent one end of said housing and having pivotal connection with one end of said trough to raise and lower the same in accordance with variations in temperature, a valve housing, means for supplying water from a source to said valve housing, means for conveying water from said valve housing to said trough, a valve connected to said trough and movable in said valve housing for varying the quantity of water supplied to said trough through said valve housing in accordance with variations in the angular position of said trough.

2. In an evaporative cooling mat for windows, a moisture control comprising a housing co-extensive with the width of said mat at the top thereof, a perforated trough tiltably mounted in said housing on a transverse axis, thermostatic means supported on said housing and operatively connected with said trough at one end thereof to raise and lower said end in accordance with variations in atmospheric temperature, a tube for transporting water from a source to said trough and means communicating with said tube and movable by said trough to vary the quantity of water supplied to said trough by said tube in accordance with variations in the angular position of said trough.

3. A window mat comprising a frame embracing water saturatable filter material, a perforated water trough pivoted at its mid-section for tilting displacement above said frame, a tube for conveying water from a source into one end of said trough, means connected to said trough adjacent its opposite end and responsive to variations in atmospheric temperature for tilting said trough and means in communication with said tube for varying the quantity of water supplied to said trough in accordance with differences in the angular position of said trough.

4. The structure of claim 3 in which the means for varying the quantity of water supplied to said trough consists of a needle valve and seat and means for raising and lowering said needle valve to effect its adjustment in relation to said seat.

5. In a window mat, a frame therefor, an elongated housing co-extensive with the width of said frame at the top thereof, a water trough having longitudinally spaced orifices in its bottom and pivoted at its mid-section for tilting displacement in said housing for the distribution of water to predetermined areas of said mat, means pivotally connected to one end of said trough for changing its angular position in accordance with variations in atmospheric temperature, means for supplying water from a source to the opposite end of said trough and means pivotally connected to and movable by said trough for varying the quantity of water supplied to said trough in accordance with changes in the angular position of said trough.

6. In a window mat, a water trough pivotally supported at its mid-section in substantial parallelism with the top of said mat for tilting displacement, said trough having perforations in spaced relation from one end to the opposite end thereof, a tube for supplying water from a source to one end of said trough, a valve housing through which said tube extends in its course to said trough, a needle valve connected pivotally to said trough and movable thereby in said housing to control the passage of water to said trough in quantities varied by the changes in angular positions of said trough, means operatively connected to the opposite end of said trough for tilting the same in degrees corresponding to variations in atmospheric temperatures.

7. The structure of claim 6 and means adjacent to and on opposite sides of needle valve for raising and lowering the same to effect its adjustment in relation to its housing.

8. In a window mat, a water trough pivotally supported at its mid-section in substantial parallelism with the top of said mat for tilting displacement, said trough having perforations in spaced relationship from one end to the opposite end thereof, a tube for supplying water from a source to one end of said trough, a valve housing through which said tube extends in its course to said trough, and a needle valve connected pivotally to said trough and moveable thereby in said housing to control the passage of water to said trough in quantities varied by the changes in angular positions of said trough.

9. The structure of claim 8 and means operatively connected to the opposite end of said trough for tilting the same in degrees corresponding to variations in atmospheric temperatures.

ARCHIE S. FEINBERG.

References Cited in the file of this patent

UNITED STATES PATENTS

| Number | Name | Date |
| --- | --- | --- |
| 1,284,334 | Hodge | Nov. 12, 1918 |
| 2,431,389 | Fleisher | Nov. 25, 1947 |